United States Patent [19]

Brosig

[11] 3,744,644

[45] July 10, 1973

[54] PHONOGRAPH RECORD INDICATOR

[76] Inventor: Heinz W. Brosig, 5711 Sanger Avenue, Alexandria, Va. 22311

[22] Filed: Sept. 27, 1971

[21] Appl. No.: 184,011

[52] U.S. Cl. .................. 211/40, 116/124 R, 312/10

[51] Int. Cl. .................. A47b 81/06

[58] Field of Search .................. 312/8, 9, 18, 19, 312/10, 12, 13, 14, 15, 16, 17; 211/40, 11; 116/124, 124.1; 340/162

[56] References Cited

UNITED STATES PATENTS

| | | | |
|---|---|---|---|
| 3,603,460 | 9/1971 | Notes | 211/40 |
| 3,275,158 | 9/1966 | Glass et al. | 211/11 |
| 2,619,966 | 12/1952 | Gallia | 211/40 |
| 2,949,309 | 8/1960 | Riggs | 340/162 |

FOREIGN PATENTS OR APPLICATIONS

| | | | |
|---|---|---|---|
| 670,288 | 4/1952 | Great Britain | 312/18 |
| 94,392 | 6/1969 | France | 211/40 |
| 593,012 | 18/1947 | Great Britain | |

*Primary Examiner*—Roy D. Frazier
*Assistant Examiner*—Thomas J. Holko
*Attorney*—Colton & Stone

[57] ABSTRACT

There is disclosed a method and apparatus for identifying phonograph records housed in a rack whereby a particular record sought may be quickly located. The identifying arrangement includes a multiple indicator carrying member mounted for movement adjacent the phonograph receiving rack, a tens position switch and a hundreds position switch for completing a circuit for energizing one of the multiple indicators and means for moving the member, in accordance with a units position digit, so that the energized indicator is aligned with the phonograph record being sought.

11 Claims, 5 Drawing Figures

INVENTOR
HEINZ W. BROSIG

BY Colton & Stone
ATTORNEY

PATENTED JUL 10 1973 3,744,644

SHEET 2 OF 4

INVENTOR
HEINZ W. BROSIG

BY Colton & Stone
ATTORNEY

PATENTED JUL 10 1973

3,744,644

SHEET 3 OF 4

INVENTOR
HEINZ W. BROSIG

BY Colton + Stone

ATTORNEY

INVENTOR
HEINZ W. BROSIG

BY Colton + Stone
ATTORNEY

PHONOGRAPH RECORD INDICATOR

BACKGROUND OF THE INVENTION

The prior art has provided suggestions for phonograph record racks inlcuding means for indicating the location of a code identified record. Devices of this type are shown in U. S. Pat. No. 3,275,158 and Great Britain Pat. No. 593,012. The indicating devices of these references are wholly electrical in character and necessarily incorporate one indicating bulb for each record. Since it is desirable that such devices have the capability of storing and indicating a relatively large number of records, the wiring arrangement necessary to distinguich each record becomes quite complex. The approach taken by each of these references to simplify the wiring arrangement is to affix, in a precise predetermined code related position, a metallic conductor on the record or record envelope. When a record is to be identified, the electric circuit used includes a segment which is affixed to the record or record envelope. It will thus be apparent that the metallic conductor affixed to the record or record envelope must be carefully positioned or the identifying arrangement is not operative.

There are a number of additional disadvantages to the above arrangements. When one desires to discard a particular record, the conductive metallic segment affixed thereto or affixed to the envelope must be removed and reattached to a new record desired to be incorporated in the identifying or indicating arrangement. It will also be apparent that the number of indicating bulbs and the concomitant wiring arrangement is expensive and may be prohibitively so. For whatever reason, it will suffice to say that, to applicant's knowledge, these arrangements have not reached the market place.

The provision of selectors for phonograph records, by which is meant devices which select and move a phonograph record from a storage position to a second position, is also known. Exemplary arrangements are found in U. S. Pat. Nos. 2,619,966 and 2,949,309. U. S. Pat. No. 2,949,309 includes an electromechanical selector.

SUMMARY OF THE INVENTION

It is an object of this invention to provide an inexpensive device for locating a stored article.

Another object of this invention is to provide a storage device for a plurality of articles including an electro-mechanical arrangement for locating a desired article.

Another object of the invention is to provide a phonograph record storage device and method of using the same for locating a desired record by energizing one of a plurality of indicators and moving all of the indicators such that the energized indicator is adjacent the desired record.

DETAILED DESCRIPTION OF THE PREFERRED EMBODIMENT

Figure 1:
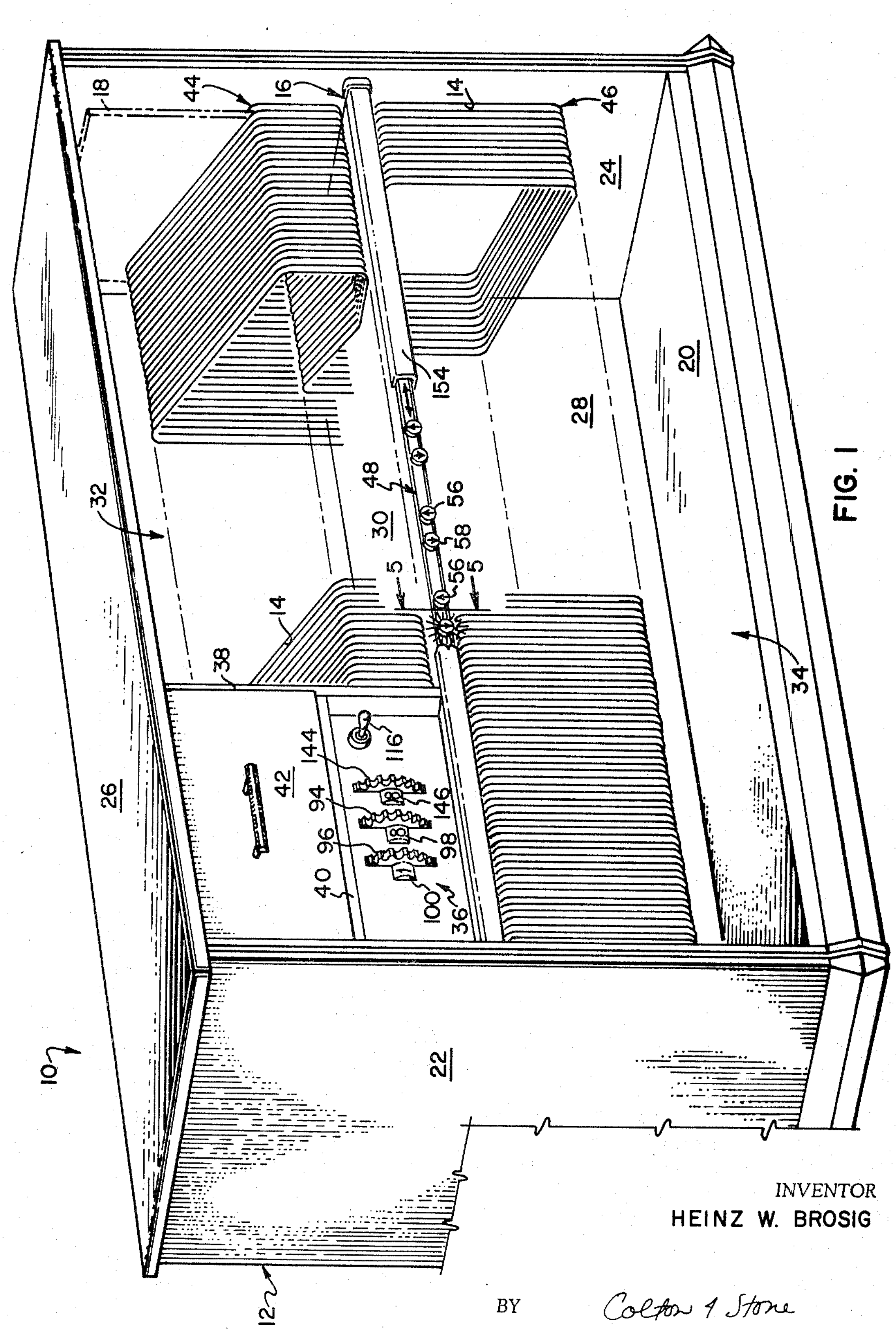
FIG. 1 is an isometric view of a phonograph record storage device of this invention, certain parts being broken away for clarity of illustration.

Referring to FIG. 1, the storage device 10 of this invention comprises as major components a cabinet 12 providing a plurality of spaced article receiving stations 14 and means 16 for locating a desired one of the articles 18.

The cabinet 12 is illustrated as comprising a bottom wall 20, side walls 22, 24, a top wall 26 and a back wall 28 providing an open front receptacle. It will be apparent that a door or other type closure may be incorporated to enclose the articles 18. Substantially bisecting the cabinet 12 is a shelf 30 providing upper and lower storage areas 32, 34. For actuating the locating means 16, there is provided a console 36 bounded by the shelf 30, a vertical partition 38 and a horizontal partition 40. A drawer 42 may be provided if desired.

Figure 2:
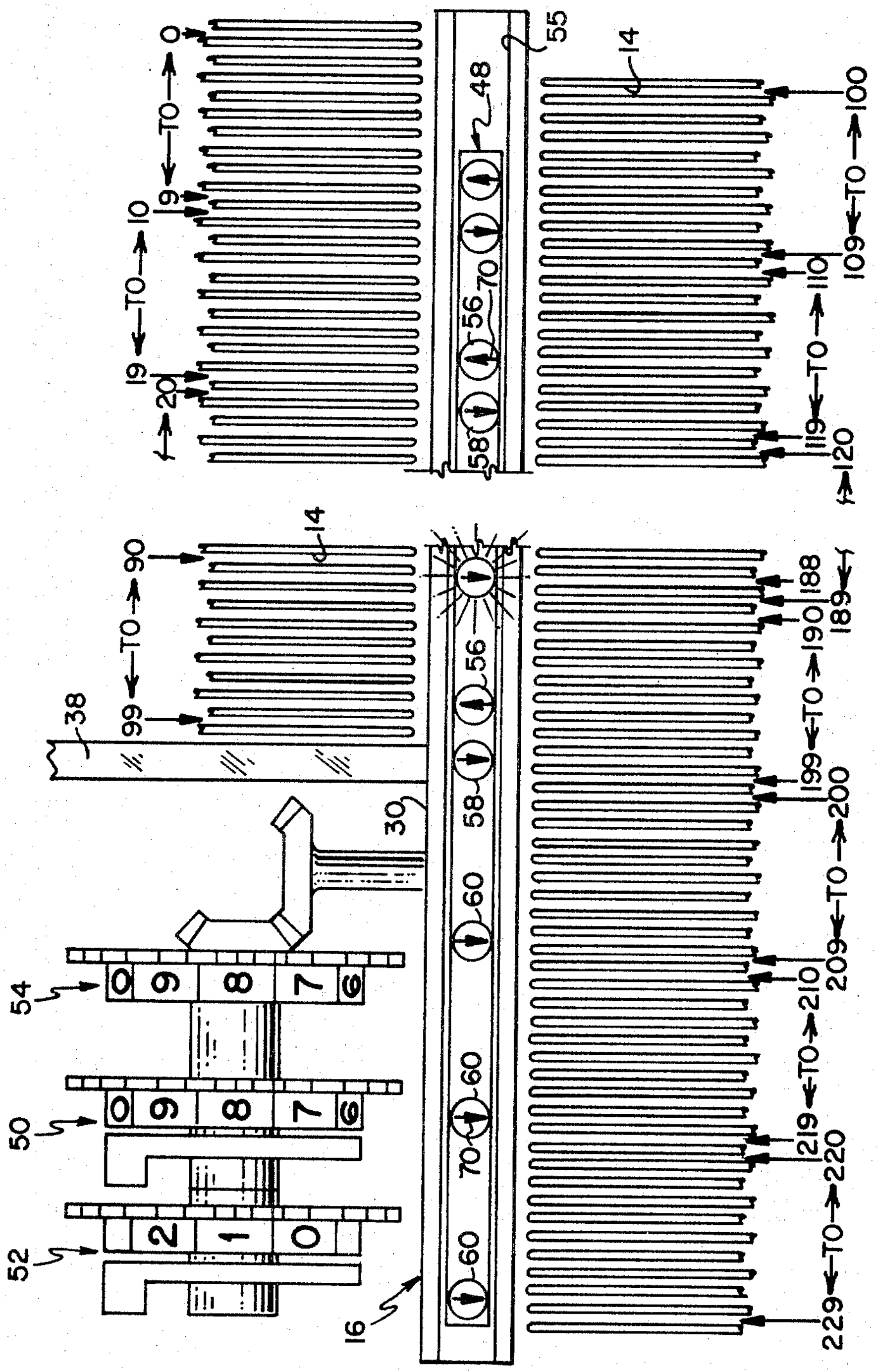
FIG. 2 is a partial front view of the phonograph record receiving stations illustrating the code identifying the same, certain parts being broken away for clarity of illustration.

The stations 14 are provided by a first record receiving rack 44 in the upper storage area 32 and a second record receiving rack 46 in the lower storage area 34. FIG. 2 illustrates a layout for the article receiving stations 14 providing a capacity of 230 records, record albums, record envelopes or the like, although the capacity may be increased or decreased substantially. The stations 14 provided by the rack 44 are illustrated as numbered 0 to 99 while the stations 14 provided by the rack 46 are numbered 100 to 229. As will be more fully apparent hereinafter, the manipulation of the two leftmost thumbwheels on the console 36 energizes one of the indicators appearing in FIGS. 1 and 2. For example, with the thumbwheels positioned as shown in FIG. 1, the indicator pointing to the stations 180–189 will be energized. By manipulating the rightmost thumbwheel, for example to the 8 position, all of the indicators are moved until the energized indicator is positioned adjacent the 8 position between 180 and 189 and therefore adjacent station 188 which corresponds to the number appearing on the console 36.

To achieve the described operating capability, the locating means 16 comprises, as major components, a multiple indicator carrying member 48, means mounting the member 48 for movement adjacent the stations 14, switch means 50, 52 for energizing a selected one of the indicators and means 54 for moving the member 48.

Figure 5:
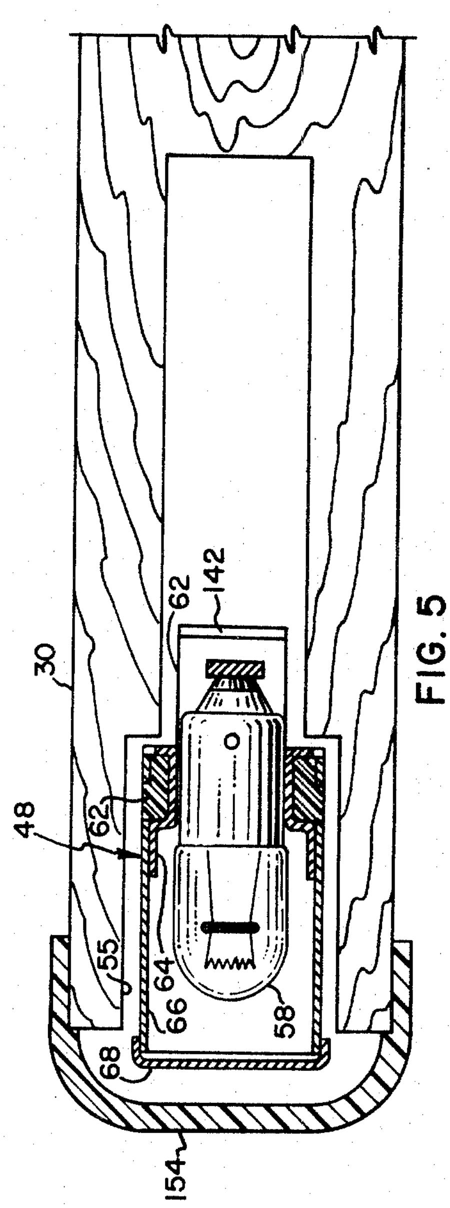
FIG. 5 is an enlarged cross sectional view of the device of FIG. 1, taken substantially along 5—5 thereof as viewed in the direction indicated by the arrows.
Figure 4:
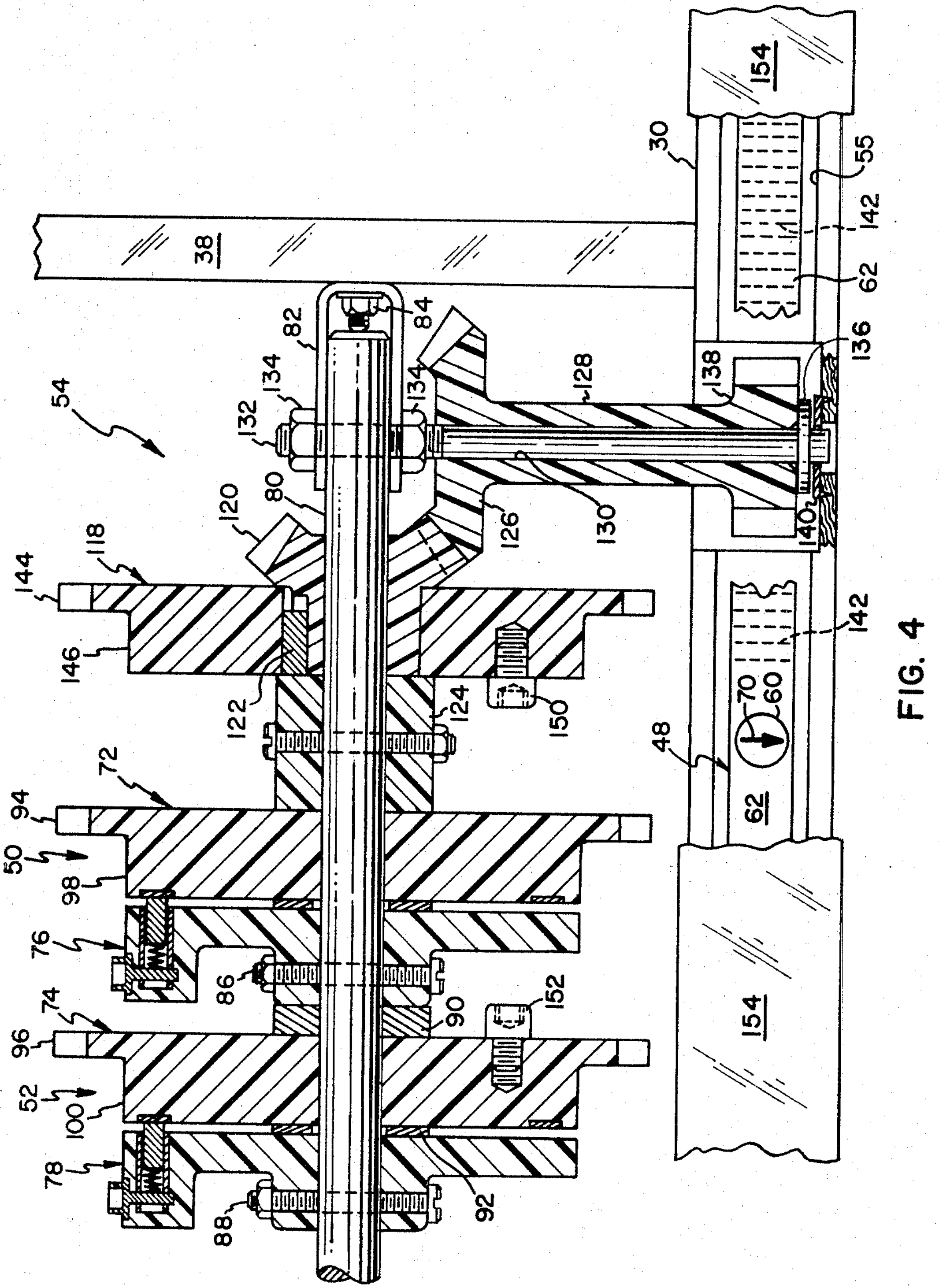
FIG. 4 is a view partially in section and partially in elevation of the mechanism for moving the indicator carrying member.

As shown in FIGS. 4 and 5, the multiple indicator carrying member 48 is conveniently mounted in a slot 55 in the shelf 30 for reciprocating movement with suitable bearing or guides being provided (not shown) for assuring reasonably precise movement. The member 48 carries a plurality of indicators which, for purposes of convenience, are denominated 56, 58, 60 and respectively identify stations 0–99, stations 100–199 and stations 200–229 as may readily be seen from FIG. 2.

The member 48 comprises an elongate member 62 (FIGS. 4 and 5) apertured to receive suitable bulb accommodating sleeves 64 which in turn receive the indicating bulbs 56, 58, 60. Received about the sleeve 64 is a housing 66 carrying a cap 68 which has thereon an arrow or other indicia 70 to point toward the upper or lower rack 44, 46 as shown best in FIGS. 1 and 2.

The switch means 50, 52 respectively include a rotatable member 72, 74 and a stationary member 76, 78 mounted on a rod 80 affixed by a pair of similar brackets 82 and fasteners 84 between the vertical partition 38 and the side wall 22. The stationary members 76, 78 are secured to the rod 80 in any suitable fashion, as by the use of conventional fasteners 86, 88. Suitable shims 90, 92 may be provided as desired. The rotatable members 72, 74 respectively include a thumbwheel 94, 96 exposed through the console 36 and an indicia bearing peripheral section 98, 100 exposed through the console 36.

Figure 3:
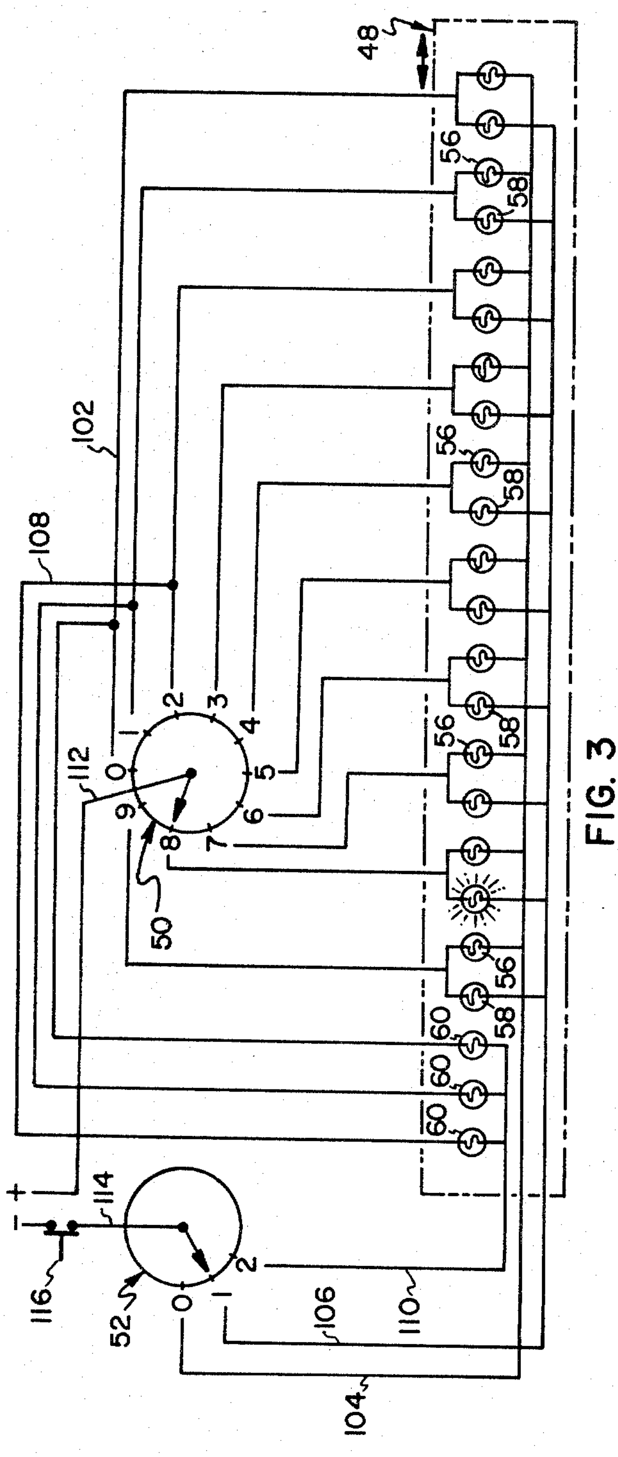
FIG. 3 is a schematic circuit diagram illustrating the manner in which the indicators are energized.

The switches 50, 52 are of conventional design and are illustrated in FIG. 3 as interconnected with the indicators 56, 58, 60 in a suitable fashion. The switch 50, which provides the tens digit of a three digit code, conveniently has ten switch positions. Each of the switch positions is connected by a lead 102 to a pair of indicators 56, 58, which are in parallel. The switch 52, which provides the hundreds digit of a three digit code, is illustrated as having three switch positions. The number of switch positions chosen for the switch 52 is governed by the desired capacity of the racks 44, 46 as will be apparent. The "zero" switch position of the switch 52 is connected by a lead 104 to the bulbs 56 while a lead 106 connects the "one" switch position to the bulbs 58. It will accordingly be apparent that the "zero" and "one" switch positions of the switch 52 in conjunction with the switch 50 controls the energization of the bulbs 56, 58 corresponding to stations 0–199.

The "zero", "one", and "two", switch positions of the tens switch 50 are respectively connected by a lead 108 to the bulb indicators 60. A lead 110 connects the "two" position of the hundreds switch 52 to the indicators 60.

The switches 50, 52 include an input lead 112, 114 and are connected to a suitable source of current, for example an AC-DC rectifier housed in the cabinet 12 which may in turn be connected to conventional house current. A conventional on-off switch 116 may be provided. It will be apparent that the member 48 may be of sufficient length to carry any desired number of indicators, which in conjuntion with a thousand positions switch, will increase the capacity of the storage device 10 manyfold.

Since the circuitry of FIG. 3 is quite similar to that disclosed in U. S. Pat. No. 3,275,158, it will suffice to say that the manipulation of the rotatable switch members 72, 74 will energize a selected one of the indicators 56, 58, 60 depending on the hundreds and tens indicia exposed through the console 36. It will also be apparent that the manipnlation of the moving means 54 will shift the member 48 so that the energized indicator is juxtaposed to the station desired.

The moving means 54 may be of any suitable type so long as movement is transferred from the driving member to the driven member without the introduction of slack or lost motion. The moving means 54 is preferably a gear drive arrangement and conveniently includes a rotatable member 118 having a bevel gear 120 either integral therewith or connected thereto, as by a key 122. Th bevel gear 120 includes a central opening rotatably mounting the member 118 on the rod 80. A suitable shim 124 is provided to prevent leftward movement of the member 118 along the axis of the rod 80. The bevel gear 120 meshes with a complementary bevel gear 126 which is integral with a shank 128. The shank 128 includes a central opening 130 and is rotatably mounted about a vertical rod 132. The rod 132 is adjustably mounted on the rod 80 by a pair of adjustable fasteners 134 to ensure meshing engagement of the gears 120, 126. The lower end of the rod 132 includes a flange 136 in supporting engagement with the underside of a pinion gear 138. The lower end of the rod 132 is conveniently captivated by a washer 140 secured to the shelf 30. The pinion 138 is in driving engagement with a rack 142 provided on the rear of the elongate member 62.

The rotatable member 118 includes a thumbwheel 144 and an indicia portion 146 which are exposed through the console 36. The rotatable member 118 conveniently has ten positions and corresponds to the units digit of a three digit code. It will be apparent that rotation of the member 118 from one position to the next is converted through the gearing 120, 126, 138, 142 to move the member 48 the distance between adjacent stations 14.

It will be apparent that the member 48 undergoes limited movement equal to the distance between the stations 0–9. It is desirable that the driving member 118 be incapable of driving the member 48 beyond this limited distance. Toward this end, suitable stop means are provided which may take any convenient configuration, such as the provision of a stop screw 150 on the rotatable member 118 cooperating with a suitable abutment (not shown) on the shim 124 or otherwise located to abut the stop 150 to prevent over rotation of the member 118. Since the hundreds switch 52 has only three operative positions in the embodiment disclosed, one or more similar stop screws 152 may be provided on the rotatable member 74 to constrain rotation thereof to the three operative positions.

The locating means 16 may also include a translucent or partially transparent cover 154 encompassing the forward edge of the shelf 30 to obscure the movement of the member 48 and the existence of the unenergized indicators 56, 58, 60. The cover 154 should have sufficient light transmitting capability to make the indicia 70 visible.

It will be noted that the racks 44, 46 are juxtaposed to the movable member 48. This arrangement prevents the records 18 from leaning out of indicating relation to the energized indicator and thus substantially prevents a properly positioned indicator from designating the next adjacent record. In contrast, if the rack 46 were located on the bottom wall 20, a record therein could lean to one side or the other out of alignment with the energized indicator.

From FIG. 2 it will be seen that the lower rack 46 is shifted horizontally from the upper rack 44. This feature allows the indicators 56, 58 to be coplanar rather than one above the other. Accordingly, in the discosed embodiment, the member 48 and the shelf 30 may be of minimal height.

The user will make a list of the records sought to be stored in the device 10 in accordance with any convenient classification scheme, for example by the last name of the recording artist, and arbitrarily assign each record a code number from 0 to 229. The user can ensure that the records are appropriately placed in accordance with the code by manipulating the thumbwheels 94, 96, 144 until the code number is visible at the console 36. When the switch 116 is closed, the appropriate indicator will locate the code identified station. The user may then place the record in the identified station. After the racks 44, 46 are filled with records, the user may consult the list prepared and obtain a code number for the desired record. By manipulating the thumbwheels 94, 96, 144 and closing the switch 116, the desired record is located by viewing the visible arrow 70 through the cover 154. The desired record may be removed. When returning a record to the device 10, the code number may be dialed into the console 36 and the appropriate station is identified so that the record may be returned to its correct position.

I claim:

1. Storage means comprising spaced article receiving stations; and means for locating a code identified station including an elongate member having fixed thereon a plurality of spaced electrically energizable indicators, means mounting the member for movement in a path placing the indicators adjacent successive stations for positioning the indicators in indicating relation thereto, means for energizing a selected one of the multiple indicators, and means for moving the member.

2. The storage means of claim 1 wherein the stations comprise a plurality of groups of juxtaposed stations, the member provides an indicator for each group, and the mounting means includes means mounting the member for movement between first and second limit positions for positioning each indicator adjacent each station of its associated group of juxtaposed stations.

3. The storage means of claim 2 wherein the group consists of ten stations.

4. The storage means of claim 1 wherein there are about ten times as many stations as indicators.

5. The storage means of claim 1 wherein the article receiving stations comprise a phonograph record receiving rack.

6. Storage means comprising first and second superposed phonograph record receiving racks providing a plurality of spaced record receiving stations; and means for locating a code identified station including a multiple indicator carrying member, means mounting the member between the first and second racks for movement adjacent the stations for positioning the indicators in indicating relation thereto, means for energizing a selected one of the multiple indicators, and means for moving the member.

7. The storage means of claim 6 wherein the first and second racks are juxtaposed to the moveable member.

8. The storage means of claim 6 wherein the first and second racks are horizontally staggered and the indicators reside in a substantially common plane, the indicators for the first rack including indicia means designating the stations of the first rack and the indicators for the second rack including indicia means designating the stations of the second rack.

9. Storage means comprising spaced article receiving stations; and means for locating a code identified station including a multiple indicator carrying member, means mounting the member for movement adjacent the stations for positioning the indicators in indicating relation thereto, means for energizing a selected one of the multiple indicators, and means for moving the member comprising a manually actuable member, a gear driven by the manually actuable member and gear teeth on the movable member in meshing engagement with the gear.

10. Storage means comprising in excess of ten spaced article receiving stations; and means for locating a code identified station including an elogate member having fixed thereon a plurality of electrically energized indicators, means mounting the member for movement in a path placing the indicators adjacent successive stations for positioning the indicators in indicating relation thereto, means for energizing a selected one of the multiple indicators including a tens position switch for completing a circuit to one of the multiple indicators, and means for moving the member in accordance with a units position digit for placing the energized indicator in alignment with the code identified station.

11. The storage means of claim 10 comprising in excess of 100 article receiving stations and wherein the energizing means includes a hundreds position switch and means placing the tens position switch and the hundreds position switch in circuit for energizing one of the multiple indicators.

* * * * *